(12) United States Patent
Fujisawa

(10) Patent No.: US 7,409,059 B2
(45) Date of Patent: Aug. 5, 2008

(54) PORTABLE TERMINAL UNIT

(75) Inventor: Eizo Fujisawa, Yokohama (JP)

(73) Assignee: Kyocera Corporation, Kyoto (JP)

( * ) Notice: Subject to any disclaimer, the term of this patent is extended or adjusted under 35 U.S.C. 154(b) by 815 days.

(21) Appl. No.: 10/761,454

(22) Filed: Jan. 21, 2004

(65) Prior Publication Data

US 2005/0130715 A1    Jun. 16, 2005

(30) Foreign Application Priority Data

Jan. 21, 2003    (JP)    ............................. 2003-012405

(51) Int. Cl.
*H04M 1/00* (2006.01)
*H04M 9/00* (2006.01)

(52) U.S. Cl. ........................... 379/433.13; 379/433.11; 455/575.4

(58) Field of Classification Search ............ 379/433.01, 379/433.11, 433.12, 433.13; 455/575.3, 455/575.4
See application file for complete search history.

(56) References Cited

U.S. PATENT DOCUMENTS

| | | | | |
|---|---|---|---|---|
| 5,485,517 | A * | 1/1996 | Gray ..................... | 379/433.13 |
| 6,856,792 | B2 * | 2/2005 | Harmon ..................... | 455/90.3 |
| 7,142,667 | B2 * | 11/2006 | Harmon et al. ........ | 379/433.13 |
| 7,158,816 | B1 * | 1/2007 | Mizuta et al. ............ | 455/575.3 |
| 7,162,030 | B2 * | 1/2007 | Bell et al. .............. | 379/433.13 |
| 7,231,188 | B2 * | 6/2007 | Godston et al. ............... | 455/73 |
| 2001/0011029 | A1 | 8/2001 | Iwabuchi et al. | |

(Continued)

FOREIGN PATENT DOCUMENTS

JP    7-288860    10/1995

(Continued)

OTHER PUBLICATIONS

Korean Office Action dated Jul. 27, 2006.
Japanese Office Action dated Jan. 22, 2008.

*Primary Examiner*—Curtis Kuntz
*Assistant Examiner*—P L Dabney
(74) *Attorney, Agent, or Firm*—Schulte Roth & Zabel LLP; John C. Garces

(57) ABSTRACT

To provide a superposition type portable terminal unit in which functions other than opening and closing functions are added to opening and closing operations thereby to improve the operating performance of the portable terminal unit. In a superposition type portable terminal unit in which a first housing having at least a display section and a second housing having at least an operation section, in a close state where the display section and the operation section face in the same direction and the housings are superimposed on each other so that the operation section of the second housing is covered with the first housing, are coupled at their ends by a coupling part having an axis in a direction where the both housings are pierced, the unit is put in an open state in case that the first housing is turned about the axis from the close state in any of a clockwise direction and a counterclockwise direction; and a control unit is provided, which selects a screen so that a first screen is displayed in the display section in case that the first housing is turned in relation to the second housing clockwise from the close state, and so that a second screen is displayed in the display section in case that the first housing is turned in relation to the second housing counterclockwise.

19 Claims, 18 Drawing Sheets

U.S. PATENT DOCUMENTS

| | | | |
|---|---|---|---|
| 2003/0064758 A1* | 4/2003 | Mizuta et al. | 455/566 |
| 2003/0068988 A1* | 4/2003 | Janninck et al. | 455/90 |
| 2004/0248628 A1* | 12/2004 | Taninai | 455/575.3 |

FOREIGN PATENT DOCUMENTS

| | | |
|---|---|---|
| JP | 11-215218 | 8/1999 |
| JP | 2002-135380 | 5/2002 |
| JP | 2002-141984 | 5/2002 |
| JP | 2002-209000 | 7/2002 |
| JP | 2003-008695 | 10/2003 |

* cited by examiner

PORTABLE TERMINAL UNIT

CROSS-REFERENCE TO RELATED APPLICATION

This application claims priority from and incorporates herein by reference the commonly-assigned Japanese Patent Application No. 2003-012405, filed on Jan. 21, 2003.

BACKGROUND OF THE INVENTION

1. Field of the Invention

The present invention relates to a portable terminal unit such as a mobile telephone or a PDA (Personal Digital Assistant), and specifically to a portable terminal unit configured to have a plurality of housings which are coupled to enable them to be overlapping each other.

2. Description of the Related Art

Conventionally, a folding type mobile telephone 2 shown in FIG. 17 is generally known as a folding type portable telephone including two housings which can be folded. In the folding type mobile telephone 2, a display screen 12 such as LCD (Liquid Crystal Display) which displays output information and a speaker 13 which are provided on an inner face 10 of one housing 4, and an operation section 16 and a microphone 15 are provided on an inner face 14 of another housing 6.

The operation section 16 has a cursor key 18 which for indicating upward, downward, right and left directions so that items displayed on the display screen 12 can be selected, and ten keys 20 for inputting numerals, characters, etc., and other keys for various functions operation section.

In such the folding type mobile telephone 2, a menu selecting screen 22 as shown in FIG. 18 is displayed on the display screen 12 so that a user can select any of its various functions which he or she wants to use.

However, the folding type mobile telephone 2 as shown in FIG. 17 has a problem that while the housing 4 and the housing 6 are folded to be close to each other, the image displayed on the display screen 12 cannot be seen unless the housings 4 and 6 are opened so as to come apart from each other, and the information cannot be browsed in a folded-up state even though information is displayed on the display screen 12.

In order to solve such a problem that it is troublesome and annoying to open the housings 4 and 6 of the folding type mobile telephone 2 in order to browse the display screen 12, there have been proposed some mobile phone sets in which the display screen 12 is directed outward not only in an opened state but also in a folded state or a state corresponding to the folded state.

Examples of the portable terminal unit are the overlapping type portable terminal units disclosed in JP-A-H11-215218, JP-A-2002-141984 and JP-A-2002-135380. These overlapping type portable terminal units are so designed that the display screen provided on one of the housings is directed outward when the two housings that are coupled are opened, which is substantially same manner as the folding type mobile telephone 2 shown in FIG. 17.

However, the design of these overlapping type portable terminal units as disclosed in JP-A-H11-215218, JP-A-2002-141984 and JP-A-2002-135380 are different from the folding type mobile telephone 2 such that one of the housings can be folded and overlapped on another housing by twisting it 180 degree at a coupling section between two housings. Therefore, it is possible to overlap the two housings each other with the display face directing outward.

Disclosed in JP-A-H07-288860 is another type of the conventional overlapping type portable terminal unit. The conventional overlapping type portable terminal unit is so designed that one housing provided with a display screen and another housing provided with an operation section are coupled each other at their end portions, in a state which the display screen and the operation section are directed in the same direction, through a shaft which is provided in a direction of passing through these housings.

This overlapping type portable terminal unit can be opened, by rotating one housing with respect to another housing around the shaft at an angle of 180 degree. Further, the two housings can be kept overlapped each other with the display screen directed outward. Thus, even if a user does not open the two housings, he or she can see an image displayed on the display screen.

In the conventional overlapping type portable terminal units, the display screen can be seen without opening the two housings. However, in the case that a user needs to operate with the operation section, after all, he or she have to rotate one of the two housings at an angle of 180 degree to change the portable terminal unit from the closed state to the opened state.

Operations to change from the closed state to the opened state are somewhat different according to the kind of overlapping type portable terminal unit. However, these operations are simple, and complex operations are not required. Therefore, although the operation for making the opened state from the closed state is always performed in order to make the opened state, addition of any other functions to this opening operation itself is not taken into consideration at all. Therefore, there is a problem that operability of the overlapping type portable terminal unit cannot be improved in this point.

To the contrary, also in the case that the overlapping type portable terminal unit is changed from the opened state to the closed state, addition of any other functions to this closing operation itself is not taken into consideration at all. Therefore, there is a problem that operability of the overlapping type portable terminal unit cannot be improved also in this point.

SUMMARY OF THE INVENTION

The object of the invention is to provide a portable terminal unit in which functions other than the opening and closing functions are added to the opening and closing operations to improve the operability of the portable terminal unit.

The invention provides a portable terminal unit having: a first housing and a second housing to be provided in a state that said first housing and said second housing overlap each other. A coupling section couples said first housing and second housing to each other at their end portions so that said first and second housings can be relatively rotated around a shaft that passes through said first and second housings. An operation section is provided on a surface of said second housing, which faces said first housing. A display section is provided on a surface of a first side of said first housing, which is opposite to a second side facing said second housing. A control section controls said display section. The portable terminal unit is in a closed state when said first housing and said second housing are overlapped and the portable terminal units is in an opened state and said operation section is exposed outside by clockwise or counterclockwise rotation of said first housing from the closed state. The control section controls to display a first screen on said display section when said first housing is rotated in relation to said second housing clockwise from the closed state, and controls to display a second screen on said display section when said first housing is rotated in relation to said second housing counterclockwise from the closed state.

The invention also provides a portable terminal unit having: a first housing and a second housing to be provided in a state that said first housing and said second housing overlap each other. A coupling section couples said first housing and second housing to each other at their end portions so that said first and second housings can be relatively rotated around a shaft that passes through said first and second housings. An operation section is provided on a surface of said second housing, which faces said first housing. A display section is provided on a surface of a first side of said first housing. A control section controls said display section. A storing section stores data of a plurality of applications. The portable terminal unit is in a closed state when said first housing and said second housing are overlapped and the portable unit is in an opened state when said operation section is exposed outside by clockwise or counterclockwise rotation of said first housing from the closed state. The control section starts a first application by reading data of the first application from said storing section and controls to display the first screen corresponding to the first application on said display section when said first housing is rotated in relation to said second housing clockwise from the closed state. The control section starts a second application by reading data of the second application from said storing section and controls to display the second screen corresponding to the second application on said display section when said first housing is rotated in relation to said second housing counterclockwise from the closed state.

The first screen is displayed on the display section when the first housing is rotated in relation to the second housing clockwise, and the second screen different from the first screen may be displayed on the display section when the first housing is rotated in relation to the second housing counterclockwise. Therefore, various functions can be added to the opening and closing operations. As a result, the operability of the portable terminal units can be improved.

Further, since the operations by opening and closing the first housing and second housing are entirely different from the operations by a ten key and a cursor key, a user can perform the opening and closing operations in clear distinction from the operations by the ten key and the cursor key. Therefore, the operability of the portable terminal unit is improved.

Further features and advantages will appear more clearly on a reading of the detailed description, which is given below by way of example only and with reference to the accompanying drawings wherein corresponding reference characters on different drawings indicate corresponding parts.

DETAILED DESCRIPTION OF THE PREFERRED EMBODIMENTS

Figure 1:
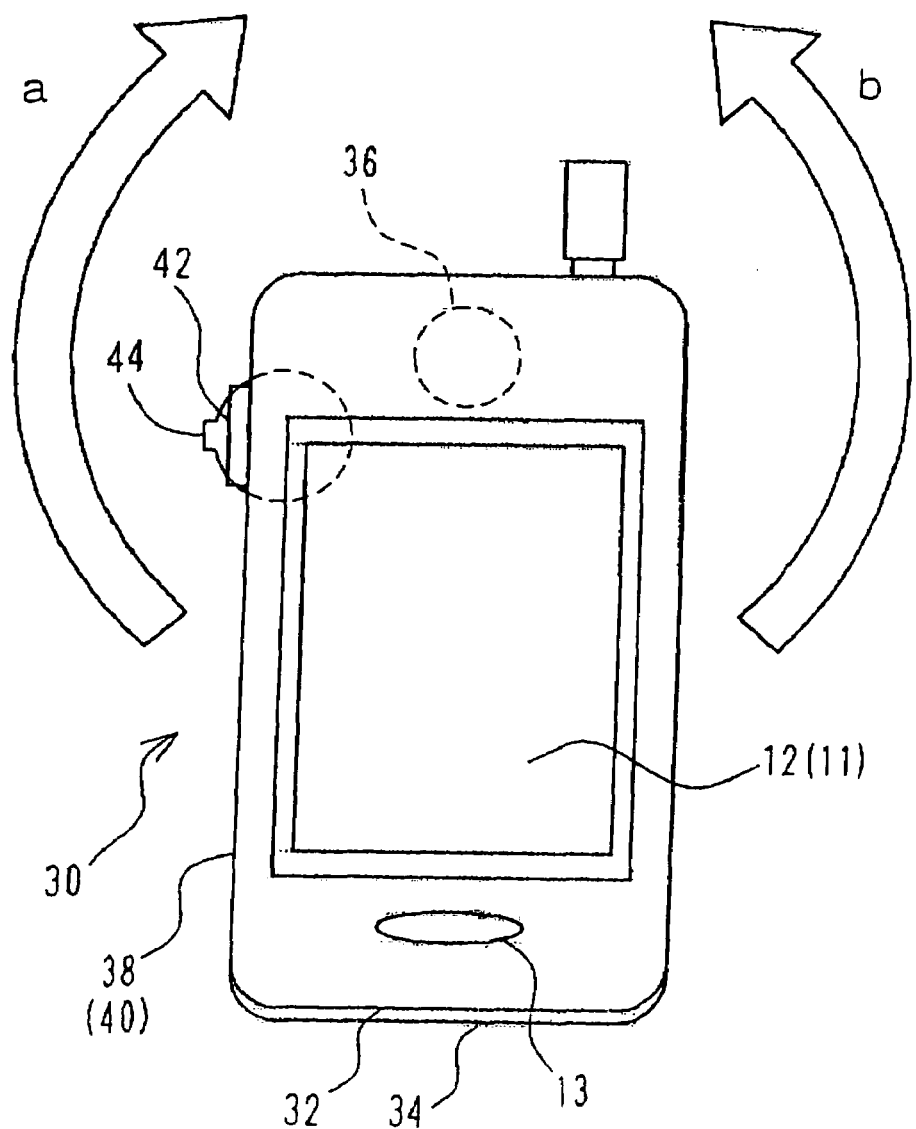
FIG. 1 is a front view showing in a closed state an overlapping type mobile telephone 30 according to one embodiment of the invention.

An Embodiment of a portable terminal unit according to the invention will be specifically described with reference to drawings.

FIGS. 1 to 16 are drawings to be referred for explaining an overlapping type mobile telephone 30 (corresponding to the portable terminal unit) according to an embodiment of the invention. A mobile telephone 30 as shown in these figures will be described with the same reference numerals for the substantially same sections in the conventional folding type portable telephone 2, and duplicate description of the substantially same structure will be omitted.

Figure 2:
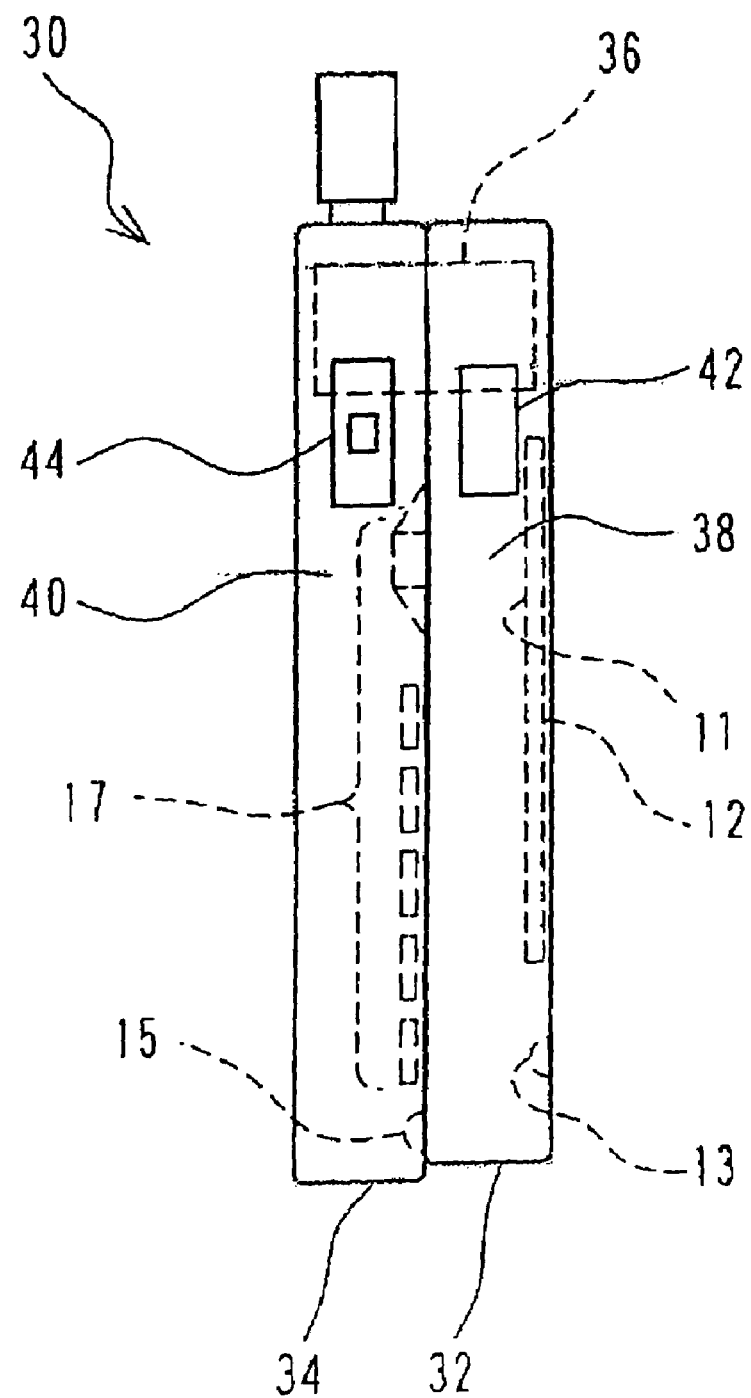
FIG. 2 is a left side view of the overlapping type mobile telephone 30 in FIG. 1.

As shown in FIGS. 1 and 2, this overlapping type mobile telephone 30 includes a first housing 32 and a second housing 34 which are coupled at their end portions by a coupling section 36 having a shaft passing through the housings 32 and 34.

In the overlapping type mobile telephone 30, a display section 11 is provided on a surface of the first housing 32, which is on opposite side to the second housing 34, so that a display screen 12 can be seen from outside even when the first housing 32 and the second housing 34 are overlapped.

A main operation section 17 corresponding to the operation section 16 of the conventional folding type mobile telephone 2 is provided in the second housing 34. Further, a side key 42 and a three way lever key 44 as auxiliary operation sections are provided on the respective side surfaces 38 and 40 of the first housing 32 and the second housing 34 in order to enable to operate even in a state that the first housing 32 and the second housing 34 are closed.

Further, on the surface of the first housing 32 where the display section 11 is provided, a speaker 13 is provided at an end opposite to the coupling section 36. On the surface of the second housing 34 where the main operation section 17 is provided, a microphone 15 is provided at an end on the opposite side to the coupling section 36.

In the overlapping type mobile telephone 30, when the first housing 32 is rotated clockwise (the direction of an arrow "a" in FIG. 2) around the shaft of the coupling section 36 through an angle of 180 degrees from the state that the first housing 32 and the second housing 34 are overlapped, the overlapping type mobile telephone 30 is put in an opened state. In the opened state the main operation section 17 provided in the second housing 34 is seen on the outside as shown in FIG. 3.

Further, also by rotating the first housing 32 counterclockwise (direction of an arrow b) through an angle of 180 degrees, as shown in FIG. 1, the overlapping type mobile telephone 30 can be put in the opened state. In the opened state the main operation section 17 provided in the second housing 34 is seen on the outside as shown in FIG. 3.

When rotated in the clockwise direction or the counterclockwise direction, the display screen 12 rotates so that it faces in substantially same direction as the main operation section 17. Therefore, it is possible to see the display screen 12 from outside even in the opened state.

Figure 3:
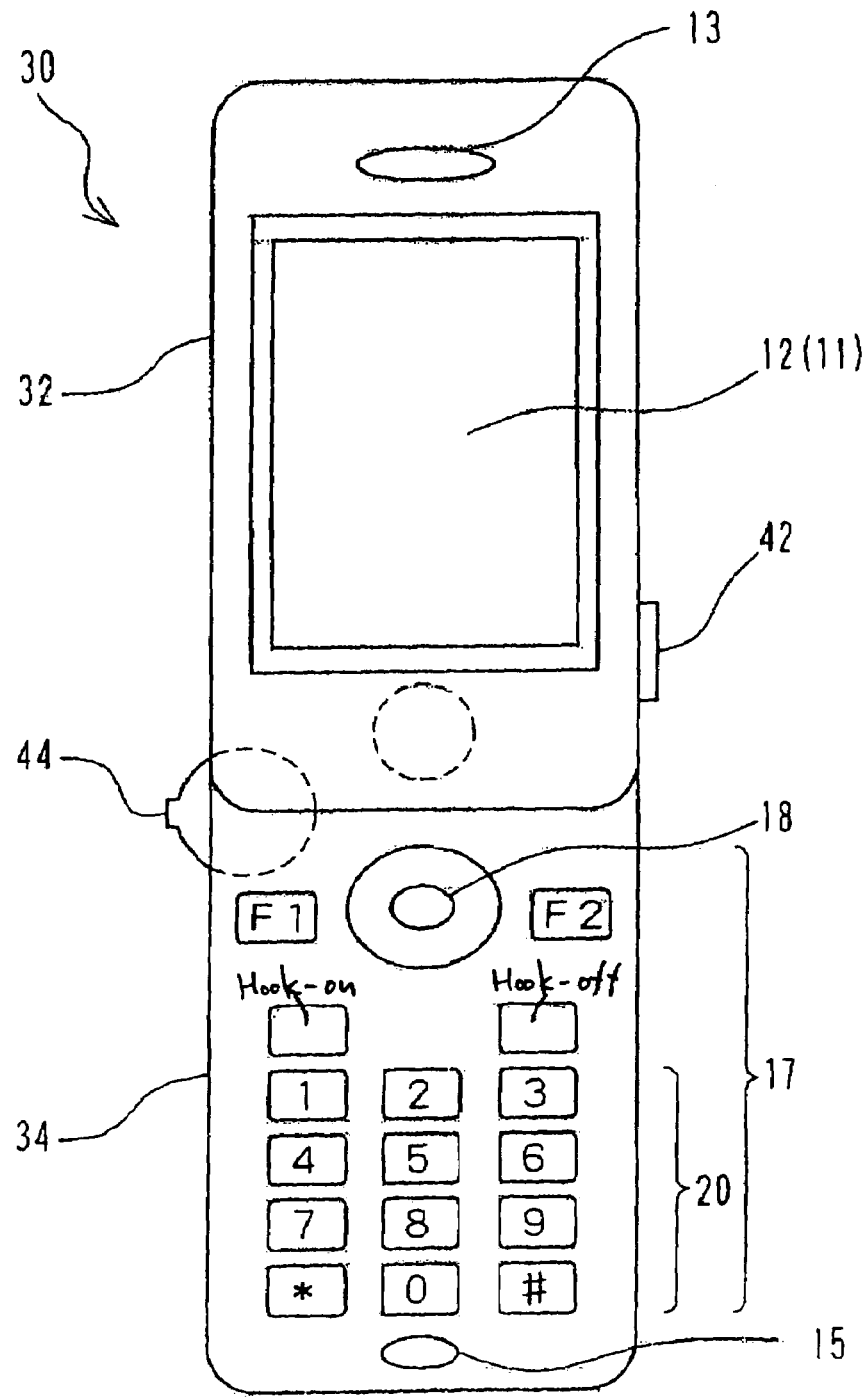
FIG. 3 is a front view showing in an open state the overlapping type mobile telephone 30 in FIG. 1.
Figure 4:
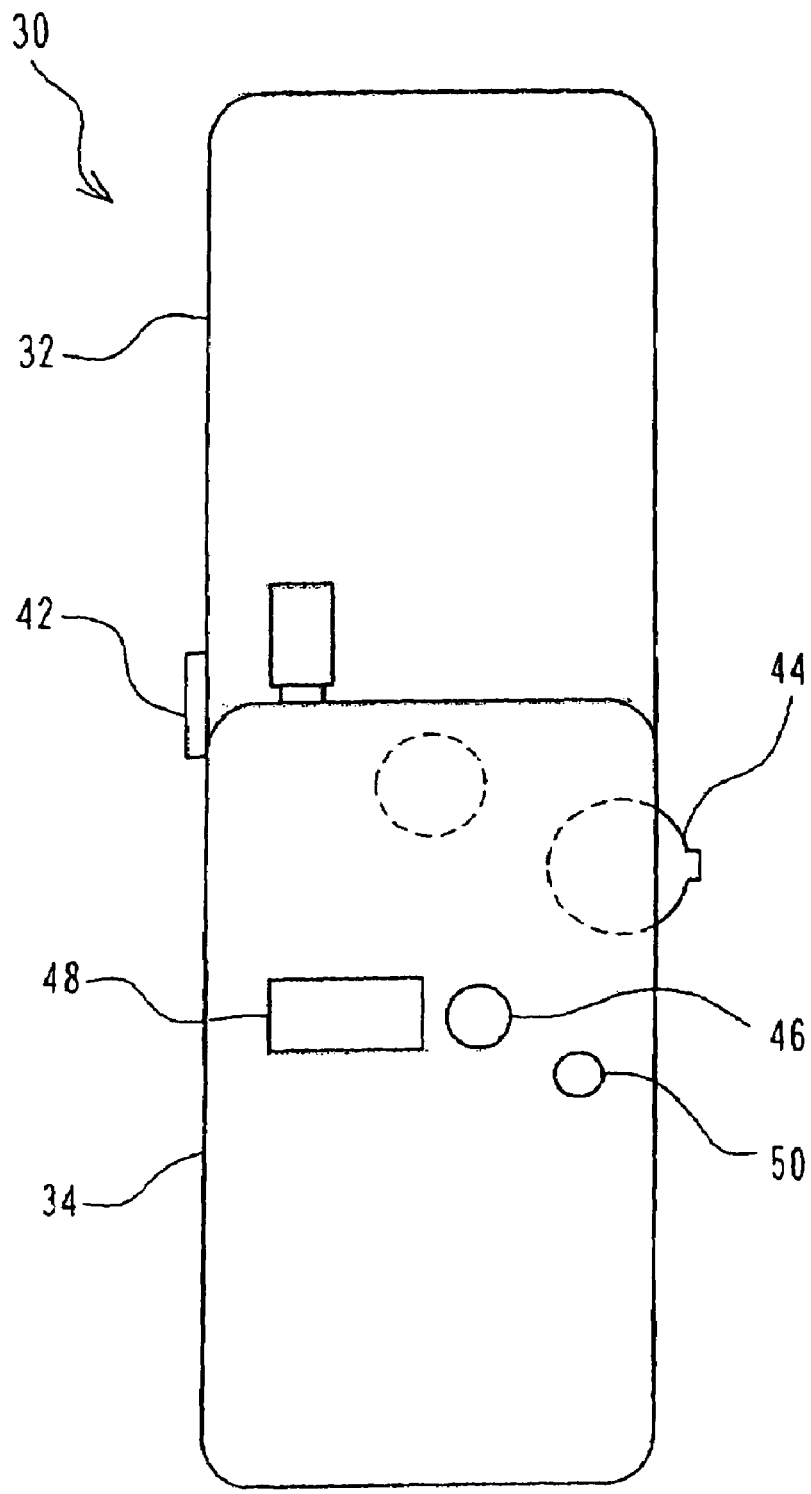
FIG. 4 is a rear view of the overlapping type mobile telephone 30 in FIG. 3.

The state as shown in FIGS. 1 and 2 is referred to as "overlapping state" or "closed state", while the state as shown in FIGS. 3 and 4 is referred to as "opened state". It is referred to as "opening action" to bring the overlapping type mobile telephone 30 from the "closed state" into the "opened state", and referred to as "closing action" to bring the overlapping type mobile telephone 30 from the "opened state" into the "closed state".

Next, the main operation section 17, the side key 42 and the three way lever key 44, and so on will be explained. As shown in FIG. 3, in the superposition type mobile telephone 30, the cursor key 18 and the ten keys 20 in the main operation section 17 of the second housing 34 can be operated in the opened state of the first housing 32 and the second housing 34. In order to prevent miss operation in this state, the side key 42 and the three way lever key 44 should be inoperative by control.

As shown in FIG. 4, the overlapping type mobile telephone 30 includes a camera 46, a mirror 48 and a microphone 50 for image recording on its back face. The camera 46 and the microphone 50 can be operated in the closed state or the opened state.

Figure 5:
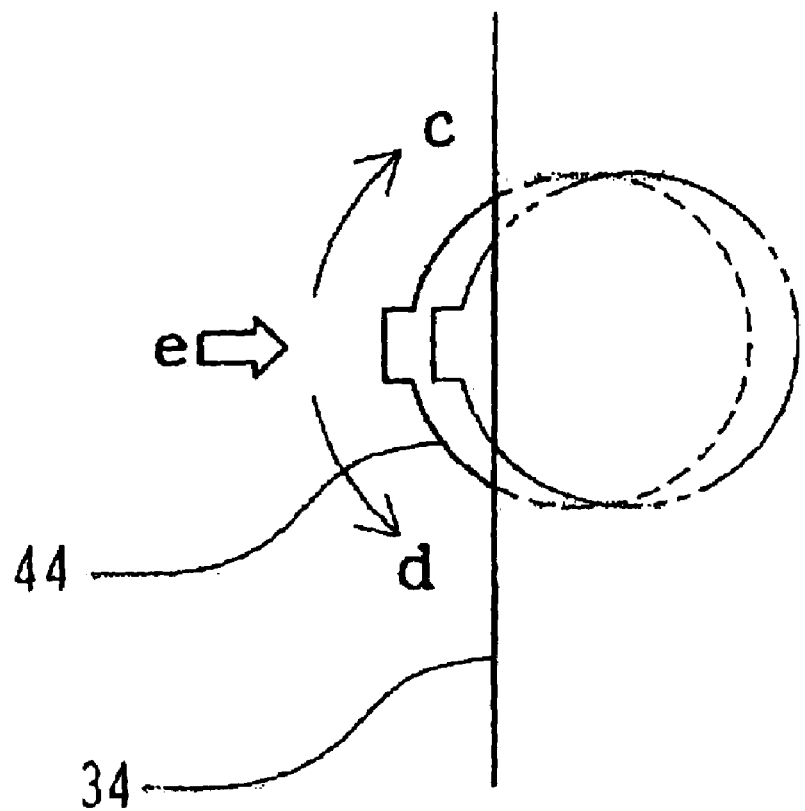
FIG. 5 is a partially enlarged view showing a three way lever key 44 of the overlapping type mobile telephone 30 in FIG. 1.

As shown in FIG. 5, the three way lever key 44, which is used in the closed state can be tilted upward (in the direction of an arrow mark "c"), can be tilted downward (in the direction of an arrow mark "d") and also can be pushed toward center (in the direction of an arrow mark "e").

Figure 18:
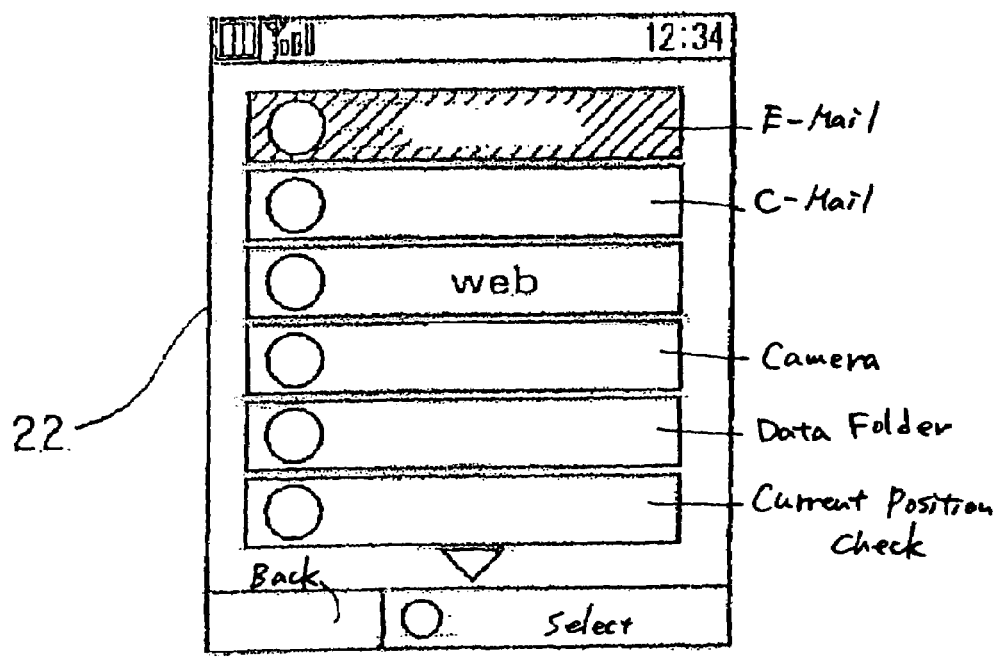

In a standby mode in the closed state, when a menu selecting screen 22 as shown in FIG. 18 is displayed on the display screen 12, the three way lever key 44 may be tilted in the direction of the arrow mark "c" or in the direction of the arrow mark "d" to select an item. Next, when the three way lever key 44 is pushed toward center (in the direction of the arrow mark "e"), the selected item is started.

The side key 42, shown in FIG. 1 to 4, can be pushed into the first housing 32 to cancel the selection of the item selected by operating toward center the three way lever key 44. Such cancellation would make the display screen 12 go back to the previous image.

Figure 6:
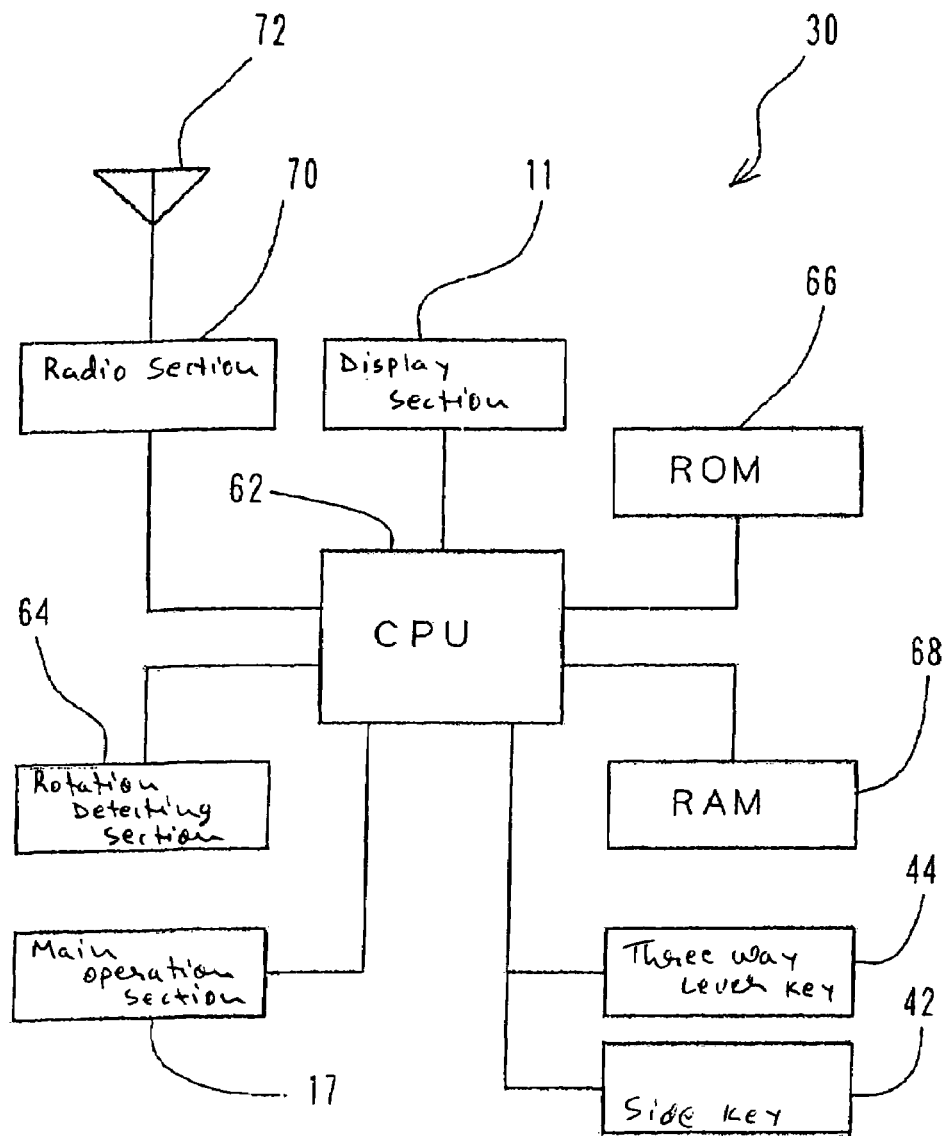
FIG. 6 is a block diagram showing a circuit of the overlapping type mobile telephone 30 according to one embodiment of the invention.
Figure 7:
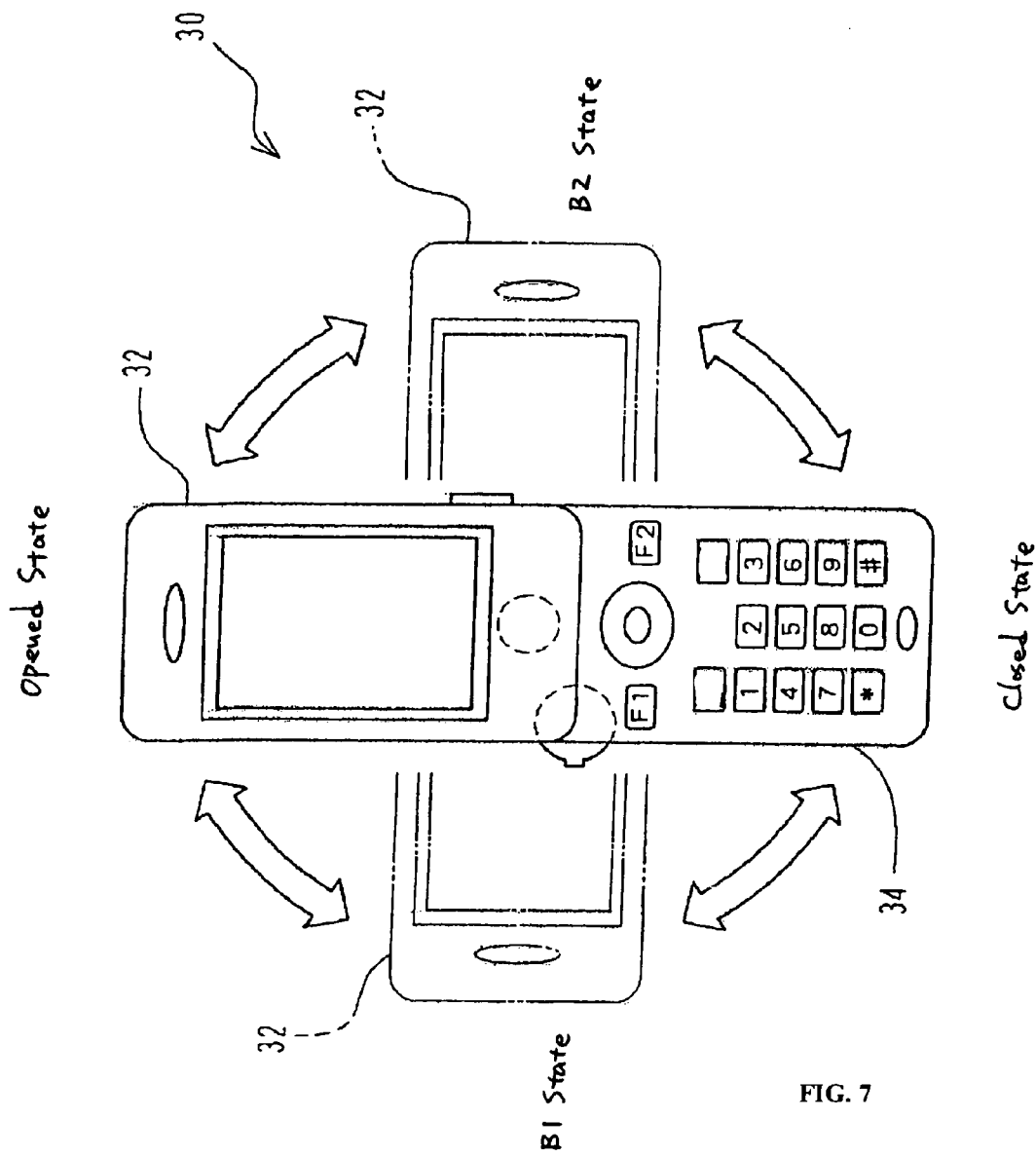
FIG. 7 is a diagram showing a rotating state of a first housing 32 of the overlapping type mobile telephone 30 in relation to a second housing 34 and their positions.

FIG. 6 is a block diagram showing a circuit of the overlapping type mobile telephone 30. A rotation detecting section 64 detects, as shown in FIG. 7, the closed state, the opened state, a state (B1 state in FIG. 7) that the first housing 32 rotates clockwise at an angle of 90° from the closed state, and a state (B2 state in FIG. 7) that the first housing 32 rotates counterclockwise at an angle of 90° from the closed state on the basis of the state of the first housing 32. The rotation detecting section 64 outputs to a CPU 62 (control section) a signal corresponding to the detected state. A volume resistance, a mechanical switch, or a sensor can be used as the rotation detecting section 64.

The CPU 62 judges whether the overlapping type mobile telephone 30 is in the closed state or in the opened state, or the rotation direction of the first housing 32 upon reception of the signal from the rotation detecting section 64.

For example, when the overlapping type mobile telephone 30 is in the closed state, in the case that a user performs the clockwise opening operation, the rotation detecting section 64 detects the state of the first housing 32 in the following order: the closed state, the B1 state, and the opened state. The rotation detecting section 64 outputs the corresponding signals to the CPU 62. Therefore, on the basis of these signals, the CPU 62 can judge that the first housing 32 rotated clockwise from the closed state and the overlapping type mobile telephone 30 is in the opened state.

Further, in the case that the user performs the counterclockwise opening operation, the rotation detecting section 64 detects the state of the first housing 32 in the following order: the closed state, the B2 state, and the opened state. The CPU 62 can judge that the first housing 32 rotates counterclockwise from the closed state and the overlapping type mobile telephone 30 is in the opened state on the basis of corresponding signals output from the rotation detecting section 64.

Similarly, when the overlapping type mobile telephone 30 is in the opened state, in the case that the user performs the clockwise or counterclockwise closing operation, the rotation detecting section 64 detects the state of the first housing 32 in the following order: the opened state, the B2 state, and the closed state; or the opened state, the B1 state, and the closed state. The CPU 62 can judge that the first housing 32 rotates clockwise or counterclockwise from the opened state and the overlapping type mobile telephone 30 is in the closed state.

Further, the CPU 62, in addition to the judging of the state and the rotation direction of the first housing 32, performs the control of the display section 11, the main operation section 17, the side key 42 and three direction lever 44 as the auxiliary operation section, a ROM 66, a RAM, and a radio section 70 connected to an antenna portion 72 thereby to execute various functions.

An application (software) started on the basis of the judgment of the state and the rotation direction of the first housing 32 by the CPU 62, and other applications are stored in the ROM 66. Data of whether the first housing 32 is in the closed state or in the opened state is stored in the RAM 68. The radio section 70 and the antenna portion 72 are used for communication with a base station by radio.

Next, the operation of the overlapping type mobile telephone 30 will be described. FIGS. 8 to 16 are diagrams for explaining various embodiments with reference to various screens 80 to 132 displayed on the display screen 12 by the operation of the overlapping type mobile telephone 30.

Figure 8:
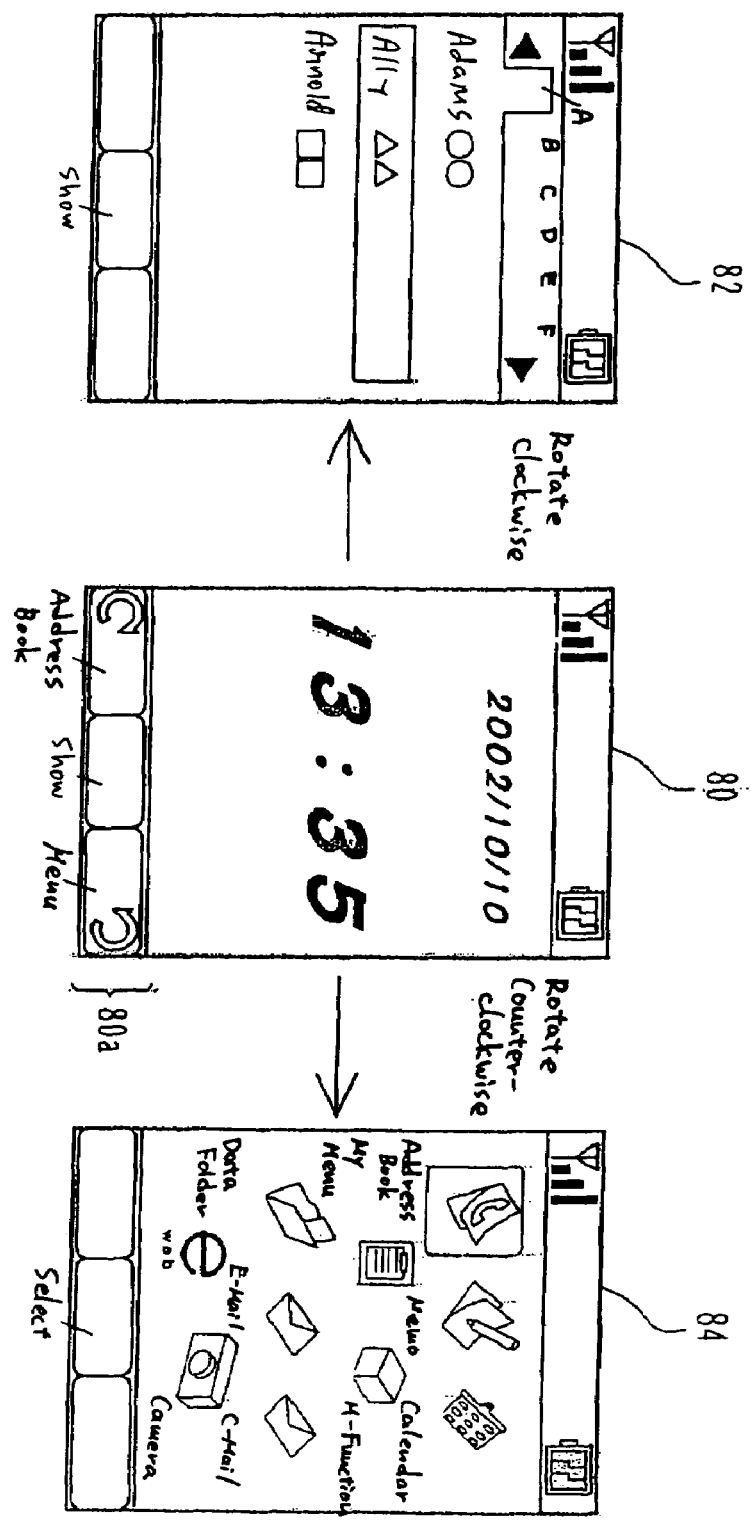
FIG. 8 is a diagram showing, in a first embodiment, a standby mode screen 80 displayed on a display screen 12 in the closed state, and an address book screen 82 and a menu selecting screen 84 which are displayed in the opened state.

With reference to FIG. 8, a first example of the overlapping type mobile telephone 30 will be described. A display of an address book screen 82 is obtained by performing the clockwise opening operation from a state having a standby mode screen 80 displayed in the closed state. A display of a menu selecting screen 84 is obtained by performing the counterclockwise opening operation.

In the case that time more than a fixed time has passed with the overlapping type mobile telephone 30 not operated in the closed state, the standby mode screen 80 is displayed on the display screen 12. In a lower portion 80a of the standby mode screen 80, a guide is displayed, which indicates that the address book screen 82 is displayed by the clockwise opening operation, and the menu selecting screen 84 is displayed by the counterclockwise opening operation.

In the case that the user performs the clockwise opening operation from this state, the rotation detecting section 64 detects this operation and outputs a signal corresponding to this operation to the CPU 62 (refer to FIG. 6). The CPU 62 judges that the telephone 30 has been put in the opened state by the clockwise rotation of the first housing 32 on the basis of this signal, and reads from the ROM 66 an application which is set to be started in the case that the telephone 30 has been put in the opened state by the clockwise rotation of the first housing 32 when the standby mode screen 80 is displayed in the closed state.

In the ROM 66, an application of address book which is started in the case that the telephone 30 has been put in the opened state by the clockwise rotation is set. Therefore, the CPU 62 starts the application of address book on the basis of this setting and displays the address book screen 82 on the display screen 12.

In the case that the user performs the counterclockwise opening operation from the state where the standby mode screen 80 is displayed on the display screen 12 in the closed state thereby to put the telephone 30 in the opened state, the rotation detecting section 64 detects this operation and outputs a signal corresponding to this operation to the CPU 62 (refer to FIG. 6). The CPU 62 judges that the telephone 30 has been put in the opened state by the counterclockwise rotation of the first housing 32 on the basis of this signal, and reads from the ROM 66 an application which is set to be started in the case that the telephone 30 has been put in the opened state by the counterclockwise rotation of the first housing 32 when the standby mode screen 80 is displayed in the closed state.

An application of menu selecting screen 84 as shown in FIG. 8 is set in the ROM 66. Menu setting screen 84 is displayed in the case that the telephone 30 has been put in the opened state by the counterclockwise rotation. Therefore, the CPU 62 displays the menu selecting screen 84 on the display screen 12 on the basis of this setting.

Figure 9:
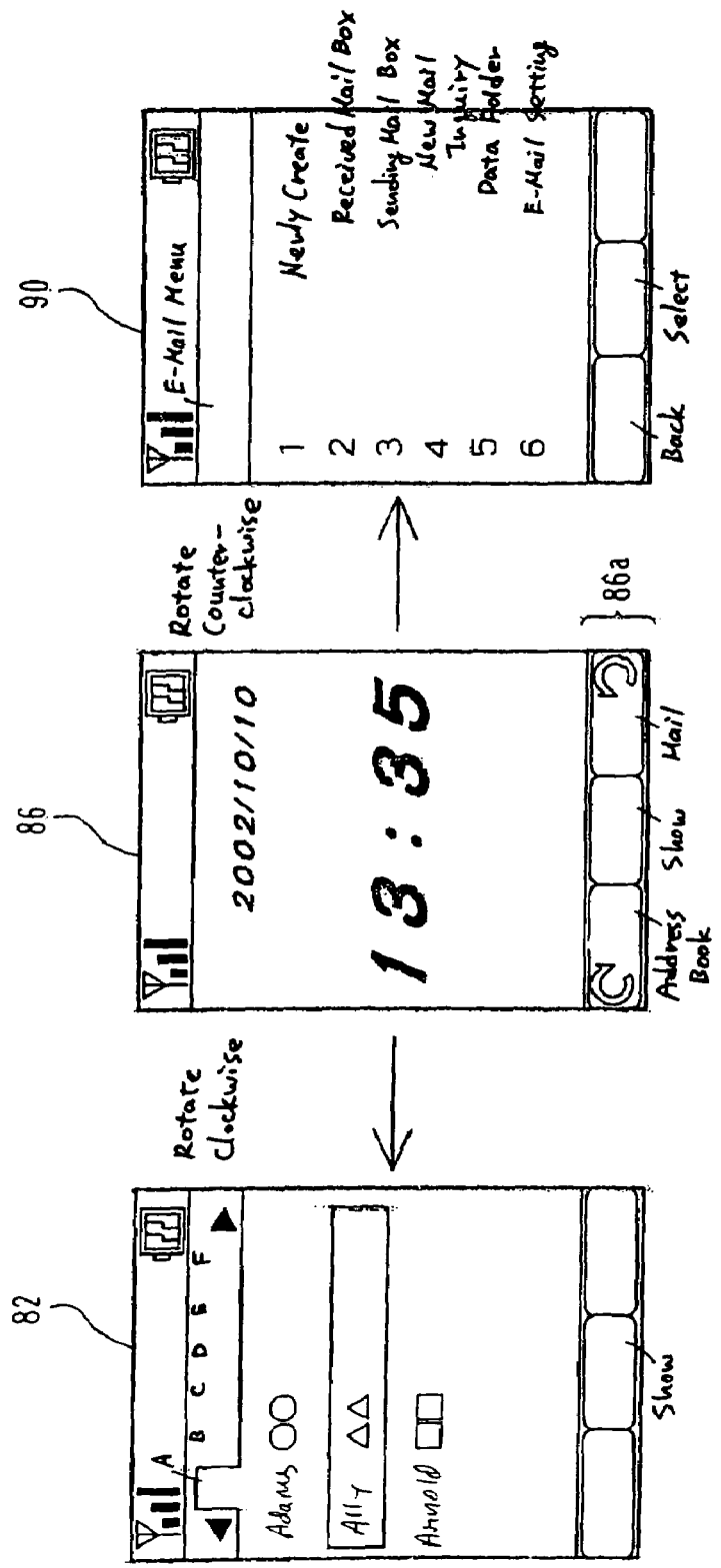
FIG. 9 is a diagram showing, in a second embodiment, a standby mode screen 86 displayed on the display screen 12 in the closed state, and an address book screen 82 and an E-mail menu screen 90 which are displayed in the opened state.

FIG. 9 shows a second example. The second example is different from the first example in the following way. In the case that the user performs the counterclockwise opening operation from the state that a standby mode screen 86 is displayed in the closed state thereby to put the telephone 30 in the opened state, an application of mail may be started and an E-mail menu screen 90 may be displayed.

In the case that the application to be started is different from the application shown in FIG. 8, it is necessary to make guide display in a lower portion 86a of the standby mode screen 86 which is different from the guide display in the lower portion 80a of the standby mode screen 80 in FIG. 8.

Figure 10:
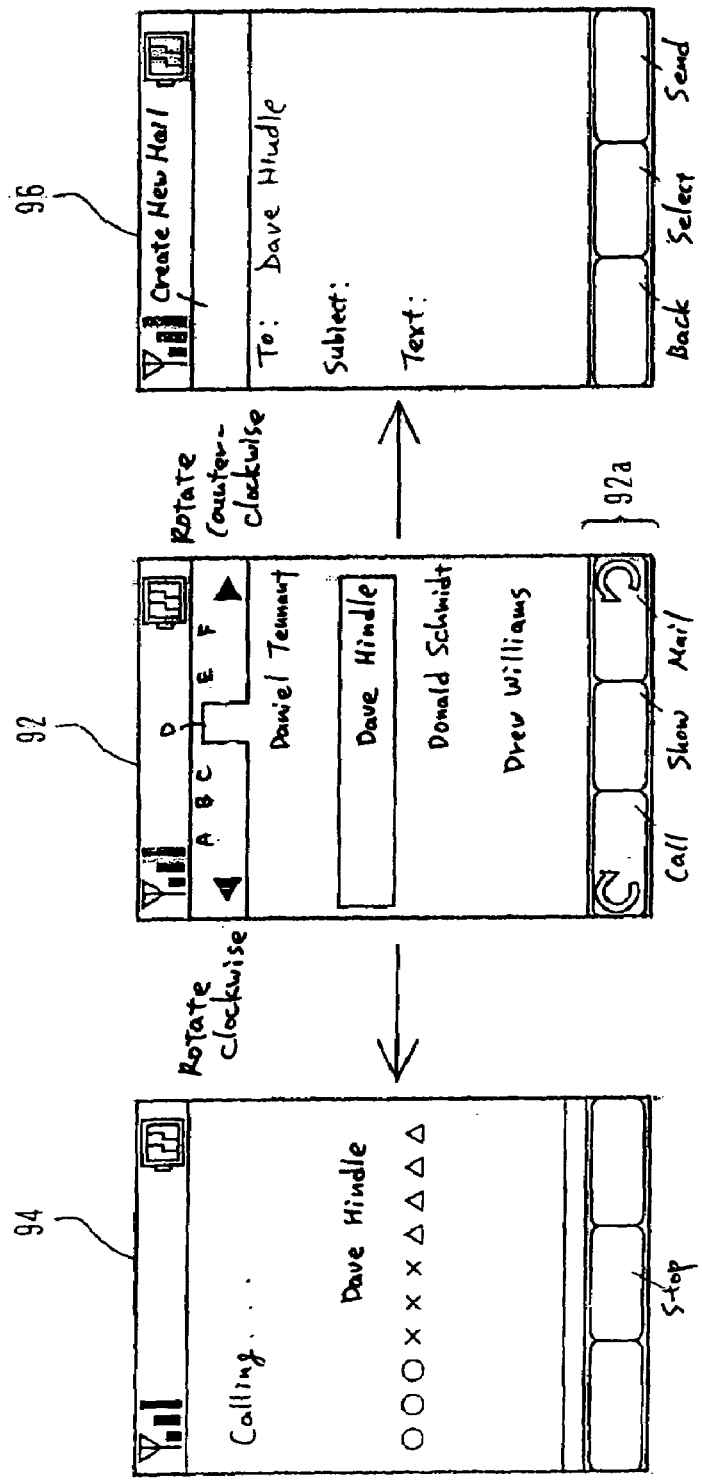
FIG. 10 is a diagram showing, in a third embodiment, an address book screen 92 displayed on the display screen 12 in the closed state, and a screen during call-making 94 and a mail creating screen 96 which are displayed in the opened state.

FIG. 10 shows a third example that illustrates the case wherein after a specific name is selected from an address book screen 92 displayed on the display screen 12 in the closed state, automatic call-making by the clockwise opening operation is performed. The third example also illustrates the case wherein a mail creating screen 96 is displayed by the counterclockwise opening operation.

In the closed state, the user operates the side key 42 and the three way lever key 44 to display the address book screen 92 on the display screen 12. At this time, in a lower portion 92a of the address book screen 92, a guide is displayed, which indicates that automatic call-making is performed for telephone conversation in the case that the clockwise opening operation is performed after the specified name was selected, and that the mail creating screen 96 is displayed in the case that the counterclockwise opening operation is performed.

In the case that the user selects a name of "Dave Hindle" in the closed state and next performs the clockwise opening operation to put the telephone in the opened state, the rotation detecting section 64 detects this operation and outputs a signal corresponding to its operation to the CPU 62 (refer to FIG. 6). The CPU 62 judges that the telephone 30 has been put in the opened state by the clockwise rotation from the closed state on the basis of this signal, and reads from the ROM 66 an application which is set so as to be started in the case that the telephone 30 has been put in the opened state by the clockwise rotation of the first housing 32 when the address book screen 92 is displayed in the closed state.

The application for automatic call-making by which a call is automatically made to the person selected from the address book screen 92 is set in the ROM 66. Therefore, the CPU 62 reads out the stored telephone number of the person, "Dave Hindle" on the basis of this setting, and operates the radio section 70 thereby to cause a dialer to perform the automatic call-making. On the display screen 12, a screen during call-making 94 is displayed.

In the case that the user selects a name of "Dave Hindle" from the address book screen 92 in the closed state and next performs the counterclockwise opening operation to put the telephone 30 in the opened state, the rotation detecting section 64 and the CPU 62 perform the operations similar to those in the case that the user performs the clockwise opening operation to put the telephone 30 in the opened state. An application for creating a mail is started, and a mail creating screen 96 is displayed on the display screen 12. Further, "Dave Hindle", which was selected from the address book screen 92, is automatically indicated in the address.

Figure 11:
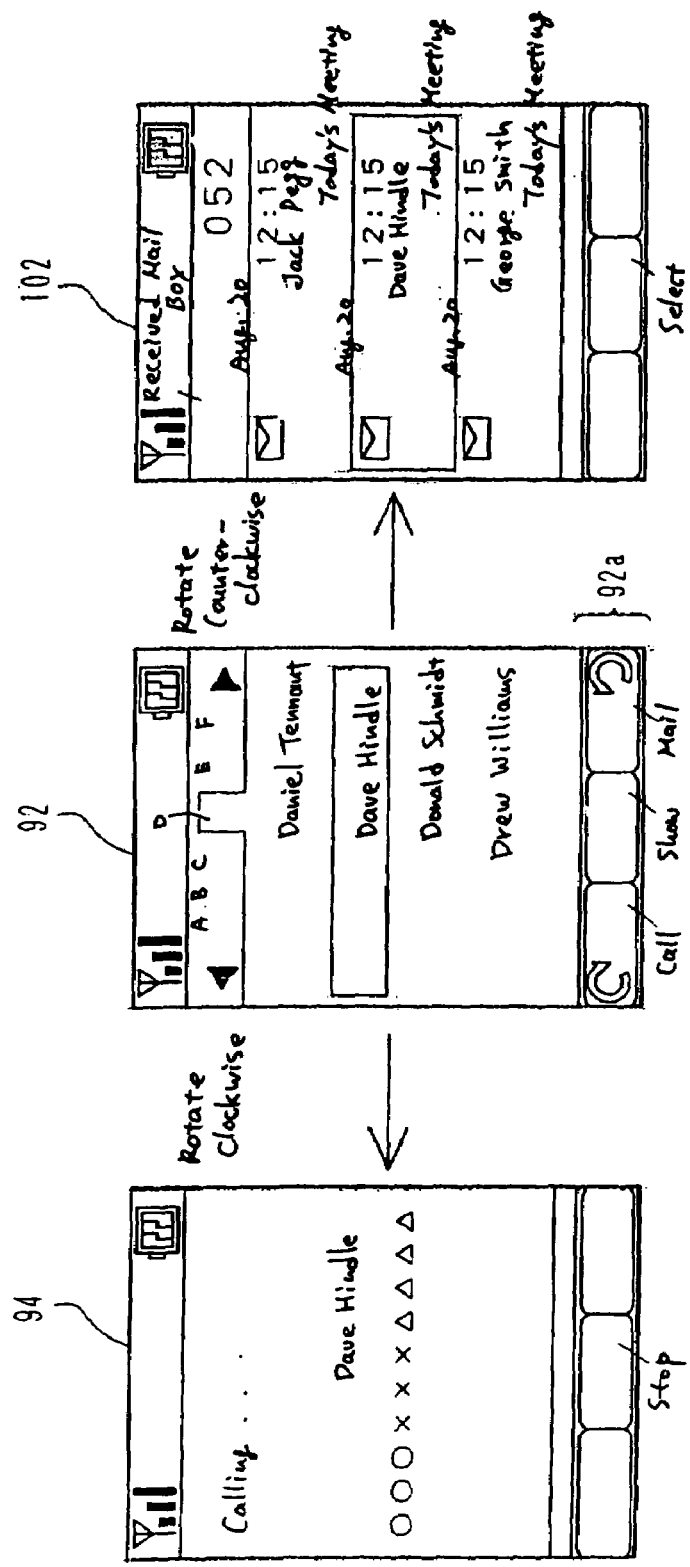
FIG. 11 is a diagram showing, in a fourth embodiment, the address book screen 92 displayed on the display screen 12 in the closed state, and the screen during call-making 94 and a received mail box screen 102 which are displayed in the opened state.

FIG. 11 shows a fourth example. In the fourth example, after the specific name was selected from the address book screen 92 in the closed state, if the user performs the counterclockwise opening operation, a received mail box screen 102 of a mail application may be displayed, and heading of the mail received from the person selected on the address book screen 92 may be searched from the received mail box screen 102 and displayed.

In the examples shown in FIGS. 8 to 11, the specific examples are shown, in which the first housing 32 rotates in relation to the second housing 34 clockwise or counterclockwise from the closed state and they open, whereby the applications and the screens which are different from the applications and the screens which are operating in the closed state are started. In the overlapping type mobile telephone 30, not only these applications and screens shown in the specific examples but also various other applications and screens can be started.

Figure 12:
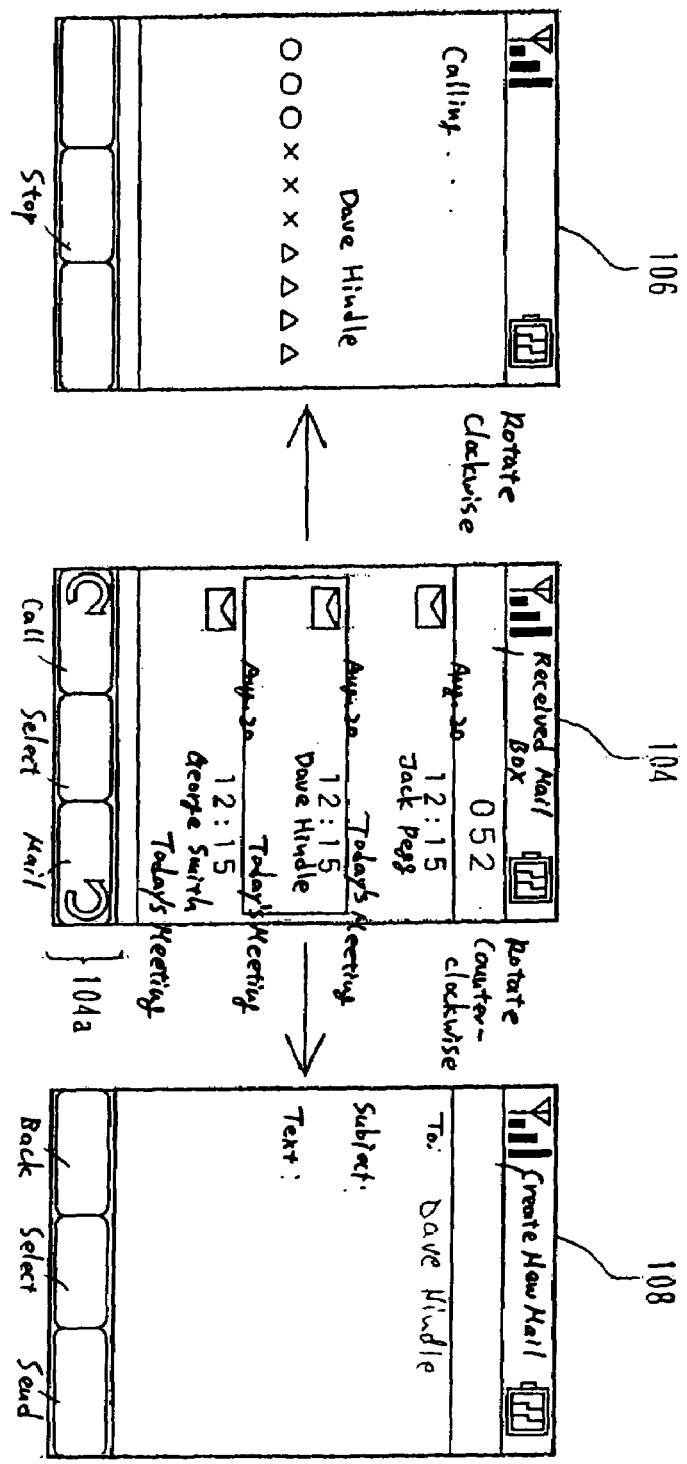
FIG. 12 is a diagram showing, in a fifth embodiment, a received mail box screen 104 displayed on the display screen 12 in the closed state, and a screen during call-making 106 and a mail creating screen 108 which are displayed in the opened state.

For example, in a fifth example shown in FIG. 12, in the case that the telephone 30 is put in the opened state by the clockwise opening operation from the state that the display section 12 displays a received mail box screen 104 in the closed state, an application for automatic call-making is started to automatically make a call to a sender of received mail, and a standby mode screen 106 during call-making is displayed. Further, in the case that the telephone 30 is put in the opened state by the counterclockwise opening operation, an application for mail is started to display a mail creating screen 108 for sending a mail to the sender of received mail.

Figure 13:
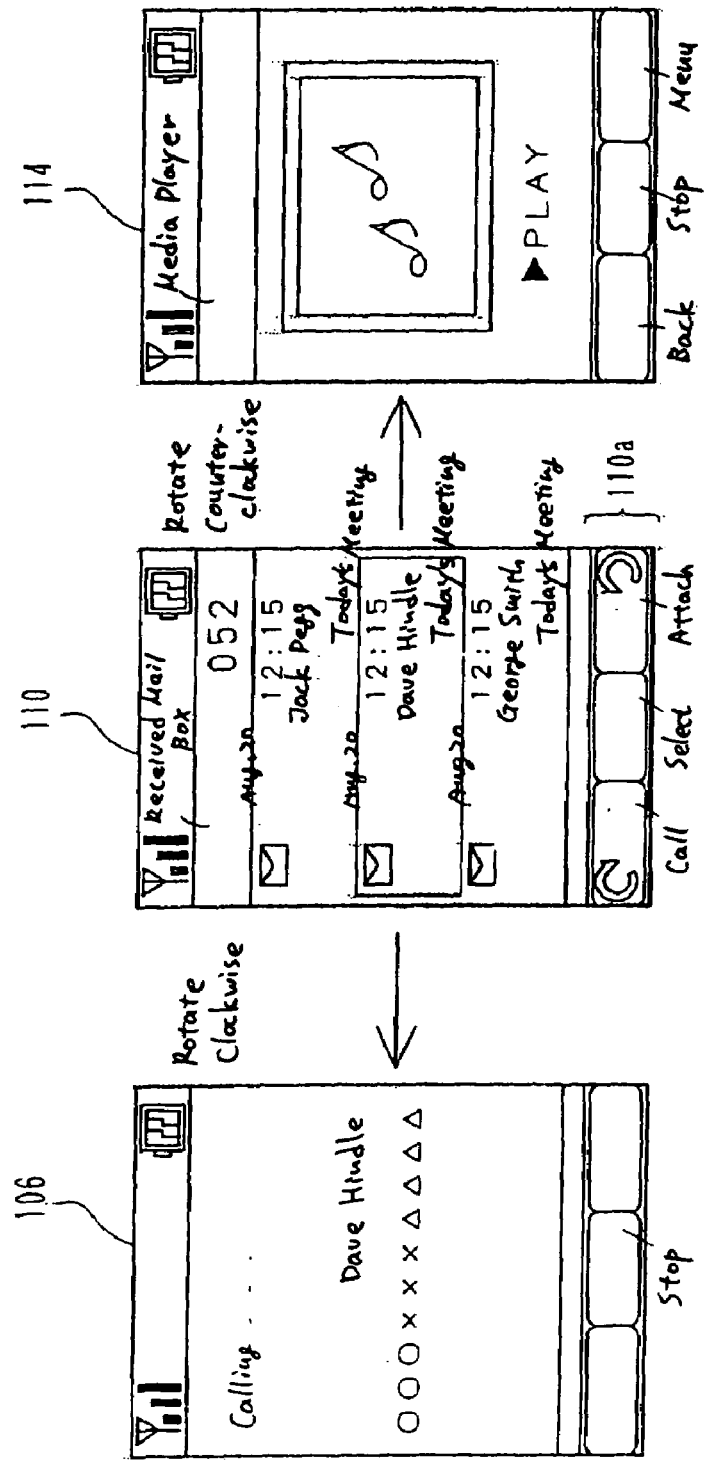
FIG. 13 is a diagram showing, in a sixth embodiment, a received mail box screen 110 displayed on the display screen 12 in the closed state, and the screen during call-making 106 and a media player screen 114 which are displayed in the opened state.

FIG. 13 shows a sixth example. In the case that the telephone 30 is put in the opened state by the counterclockwise opening operation from the state that a received mail box screen 110 is displayed in the closed state, an application for a media player is started to reproduce a melody attached to the received mail, and a media player screen 114 is displayed. Further, in the case that the telephone 30 is put in the opened state by the clockwise opening operation from the state that the display section 12 displays a received mail box screen 110 in the closed state, an application for automatic call-making is started to automatically make a call to a sender of received mail, and a standby mode screen 106 during call-making is displayed.

Figure 14:
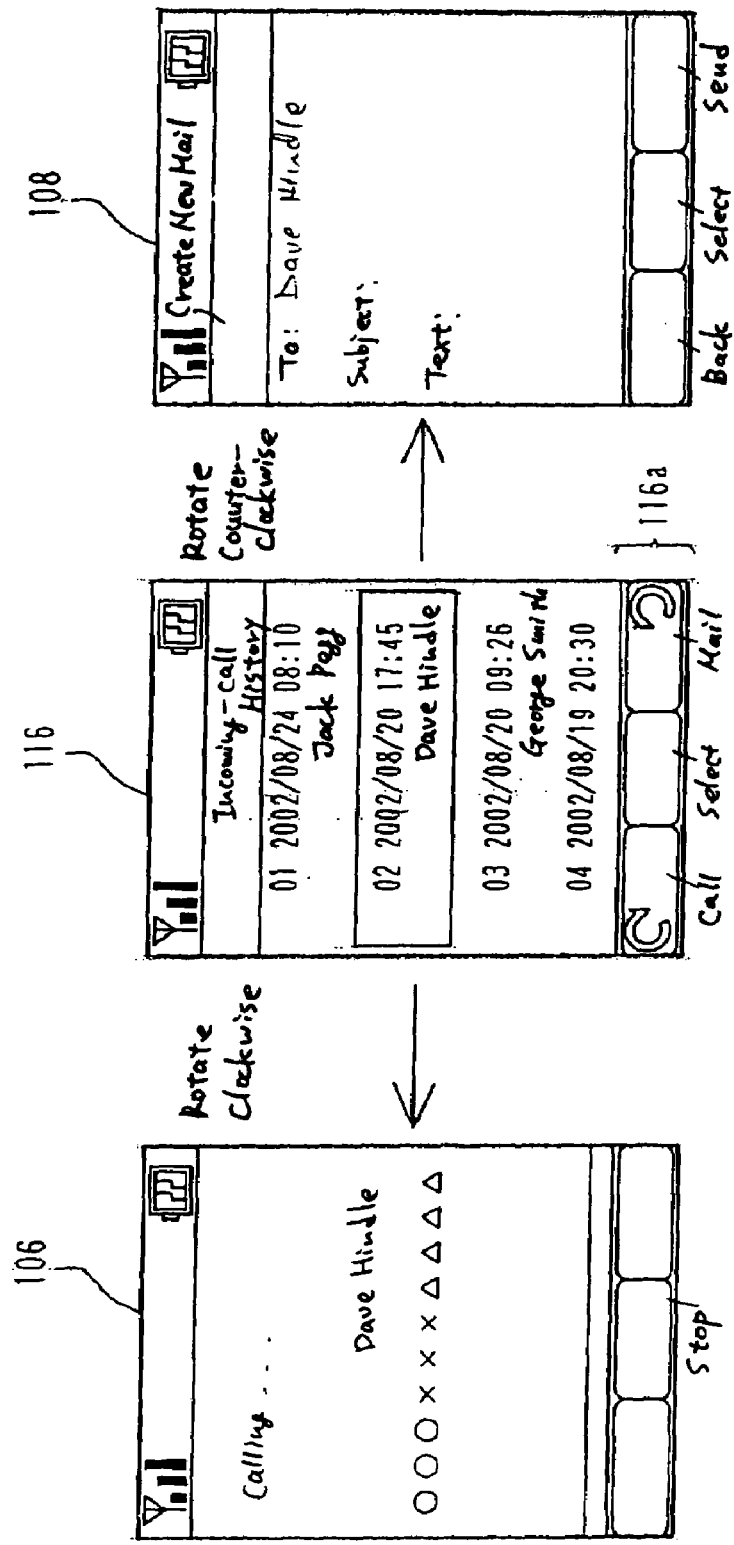
FIG. 14 is a diagram showing, in a seventh embodiment, an incoming-call history screen 116 displayed on the display screen 12 in the closed state, and the screen during call-making 106 and the mail creating screen 108 which are displayed in the opened state.

In a seventh example shown in FIG. 14, in the case that the telephone 30 is put in the opened state by the clockwise opening operation from the state that an incoming call history screen 116 is displayed in the closed state, the application for the automatic call-making is started, a call is made to the sender recorded in the incoming-call history, and the screen during call-making 106 is displayed. In the case that the telephone 30 is put in the opened state by the counterclockwise opening operation, the application for the mail is started and the mail creating screen 108 to the sender of the received mail is displayed.

Figure 15:
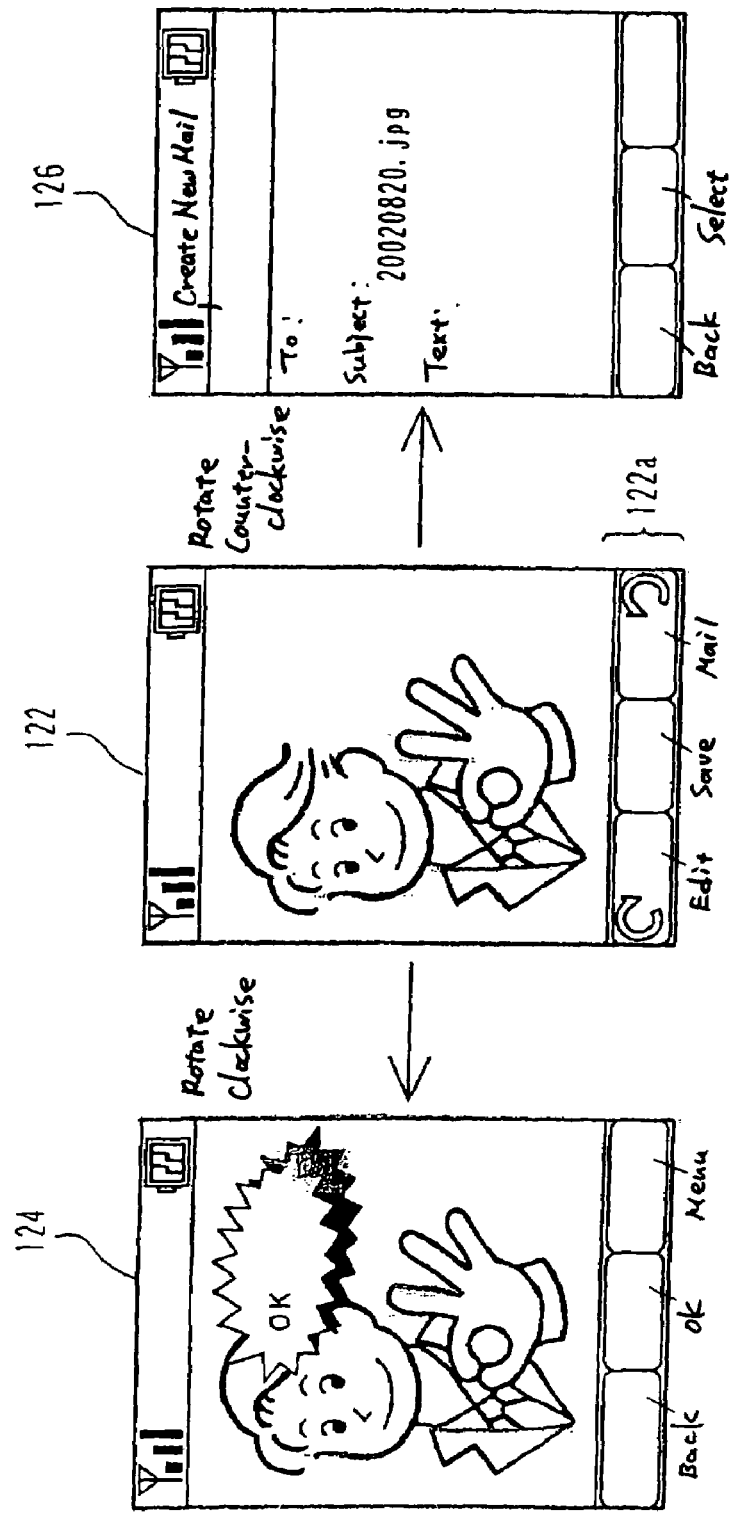
FIG. 15 is a diagram showing, in an eighth embodiment, an image reproduction screen 122 displayed on the display screen 12 in the closed state, and an image editing screen 124 and a mail creating screen 126 which are displayed in the opened state.

In an eighth example shown in FIG. 15, in the case that the telephone 30 is put in the opened state by the clockwise opening operation from the state that an image reproduction screen 122 is displayed in the closed state, an image editing screen 124 on which editing work such as addition of comment can be performed is displayed. Further, in the case that the telephone 30 is put in the opened state by the counterclockwise opening operation, an application for the mail is started, and a mail creating screen 126 about the mail to which an image is attached is displayed.

As shown in FIGS. 12 to 15, the first housing 32 rotates clockwise or counterclockwise from the closed state thereby to open the telephone 30, whereby the various applications can be started and screens can be shown. In order to cause the user to recognize these advantages, guides corresponding to the applications and screens started by the opening operation are displayed on lower portions 104a, 110a, 116a and 122a of the received mail box screen 104, the received mail box screen 110, the incoming-call history screen 116 and the image reproduction screen 122 shown in FIGS. 12 to 15.

The specific examples in which the opening operation is performed from the closed state have been described in FIGS. 8 to 15. In the overlapping type mobile telephone 30, the applications set in the ROM 66 is automatically started even in the case that the closing operation is performed from the opening state.

Figure 16:
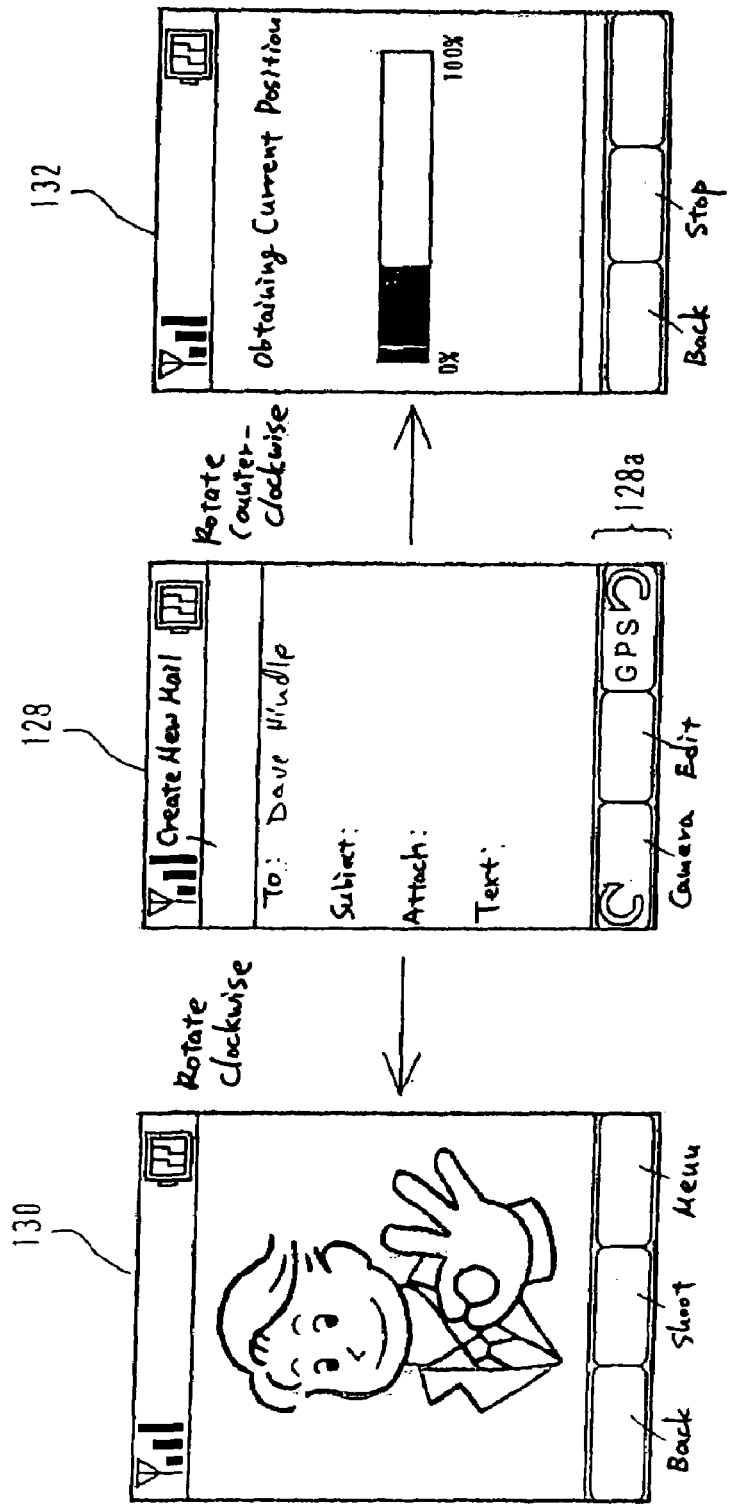
FIG. 16 is a diagram showing, in a ninth embodiment, a mail creating screen 128 displayed on the display screen 12 in the opened state, and a camera screen 130 and a GPS screen 132 which are displayed in the closed state.
Figure 17:
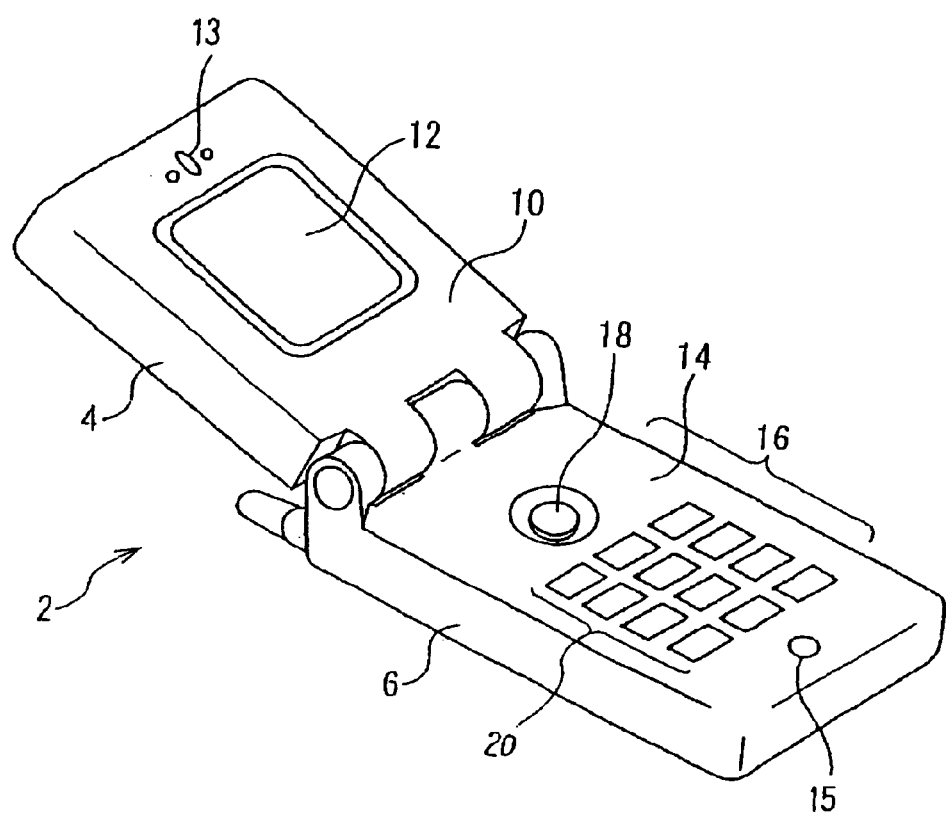

For example, as shown in a ninth example shown in FIG. 16, in the state that a mail creating screen 128 is displayed in the opened state, the clockwise closing operation is performed to put the telephone 30 in the closed state, whereby the camera function is started so that an image picked up by the camera can be displayed such as shown on a camera screen 130. Further, the counterclockwise closing operation is performed to put the telephone in the closed state, whereby a GPS (Global Positioning System) screen 132 can be displayed.

Also in this case, in a lower portion 128a of the mail creating screen 128, a guide is displayed, which indicates that the camera function is started by the clockwise closing operation, and the GPS function is started by the counterclockwise closing operation.

Regarding the various screens 80 to 132 shown in FIGS. 8 to 16, when the telephone 30 is put in the opened state from the closed state or when the telephone 30 is put in the closed state from the opened state, the upside of each screen on the display screen 12 is turned down. Therefore, in such a case, the display of the screen is naturally reversed at an angle of 180 degrees.

Regarding the various screens which have been described in each embodiment and denoted by the reference numerals 80 to 132, that is, the standby mode screen, the address book screen, the menu selecting screen, the e-mail menu screen, the screen during call-making the mail creating screen, the received mail box screen, the media player screen, the incoming-call history screen, the image reproduction screen, the image editing screen, the camera screen, and the GPS screen, as long as screens are equivalent to these screens, names are not limited to these names, and the design of the screen is also not limited to the shown design.

Although the overlapping type portable terminal unit 30 having the two housings 32 and 34 has been shown in the above embodiment, the invention can be applied also to an overlapping type portable terminal unit having more than three housings on the basis of the similar technical idea.

Although the invention is applied to the mobile telephone in the above embodiment, it can be similarly applied to other portable terminal units such as the PDA.

As described above, according to the overlapping type portable terminal unit 30 of the invention, it is possible to make the first screen displayed in the display section in the case that the first housing 32 is rotated clockwise in relation to the second housing 34 differ from the second screen displayed in the display section in the case that the first housing 32 is rotated counterclockwise in relation to the second housing 34. Therefore, since the various functions can be added to the opening and closing operations, the operability of the overlapping type portable terminal unit 30 can be improved.

Therefore, since the application and the screen can be selected and started by only the opening and closing operations of the first housing 32 and the second housing 34, the operability of the overlapping type portable terminal unit 30 can be improved, and the operation for starting the desired application and screen can be simplified, so that the overlapping type portable terminal unit 30 of the invention is convenient.

Further, the operation by the opening or closing operation of the first and second housings 32 and 34 is entirely different from the operation by the ten keys 20 or the cursor key 18, and the user can clearly distinguish the operation by the opening or closing operation from the operation by the ten keys 20 or the cursor key 18. Therefore, the operability of the overlapping type portable terminal unit 30 can be further improved.

While a preferred embodiment of the invention has been described, various modifications will be apparent to one skilled in the art in light of this disclosure and are intended to fall within the scope of the appended claims.

What is claimed is:

1. A portable terminal unit comprising:

a first housing and a second housing, said first housing and said second housing overlapping each other;

a coupling section which couples said first housing and second housing to each other at their end portions so that said first and second housings are relatively rotatable around a shaft which passes through said first and second housings;

an operation section provided on a second housing surface, which faces said first housing;

a display section provided on a surface of a first side of said first housing, said surface being opposite to a second side of said first housing, said second side facing said second housing; and a control section which controls said display section, wherein said portable terminal unit is in a closed state when said first housing and said second housing are overlapped and said portable terminal unit is in an opened state when said operation section is exposed to outside by clockwise or counterclockwise rotation of said first housing from the closed state, and said control section controls to display a first screen on said display section when said first housing is rotated in relation to said second housing clockwise from the closed state, and controls to display a second screen on said display section when said first housing is rotated in relation to said second housing counterclockwise from the closed state.

2. The portable terminal unit according to claim 1, wherein said first screen and said second screen are different screens based on different applications.

3. The portable terminal unit according to claim 1, wherein said control section, in the closed state, controls to display a standby mode screen on said display section, and said control section, in the opened state, controls to display an address book screen for one of said first screen and said second screen, and display a menu selecting screen for another of said first screen and said second screen.

4. The portable terminal unit according to claim 1, wherein said control section, in the closed state, controls to display an address book screen on said display section, and said control section, in the opened state, controls to display a screen during call-making for one of said first screen and said second screen, and display a mail creating screen for another of said first screen and said second screen.

5. The portable terminal unit according to claim 1, wherein said control section, in the closed state, controls to display an address book screen on said display section, and said control section, in the opened state, controls to display a screen during call-making for one of said first screen and said second screen, and display a received mail box screen for another of said first screen and said second screen.

6. The portable terminal unit according to claim 1, wherein said control section, in the closed state, controls to display a received mail box screen on said display section, and said control section, in the opened state, controls to display a screen during call-making for one of said first screen and said second screen, and display a mail creating screen for another of said first screen and said second screen.

7. The portable terminal unit according to claim 1, wherein said control section, in the closed state, controls to display an incoming-call history screen on said display section, and said control section, in the opened state, controls to display a screen during call-making for one of said first screen and said second screen, and display a mail creating screen for another of said first screen and said second screen.

8. The portable terminal unit according to claim 1, wherein said control section, in the closed state, controls to display an image reproduction screen to reproduce an image on said display section, and said control section, in the opened state, controls to display an image editing screen for one of said first screen and said second screen, and display a mail creating screen to create a mail to which an image is automatically attached for another of said first screen and said second screen.

9. The portable terminal unit according to claim 1, wherein said portable terminal is a mobile telephone.

10. The portable terminal unit according to claim 1, wherein said portable terminal is a personal digital assistant.

11. A portable terminal unit comprising:

a first housing and a second housing, said first housing and said second housing overlapping each other;

a coupling section which couples said first housing and second housing to each other at their end portions so that said first and second housings are relatively rotatable around a shaft which passes through said first and second housings;

an operation section provided on a second housing surface, which faces said first housing;

a display section provided on a surface of a first side of said first housing, said surface being opposite to a second side of said first housing, said second side facing said second housing;

a control section which controls said display section; and a storing section in which data of a plurality of applications are stored, wherein said portable terminal unit is in a closed state when said first housing and said second housing are overlapped and said portable terminal unit is in an opened state when said operation section is exposed to outside by clockwise or counterclockwise rotation of said first housing from the closed state, and said control section starts a first application by reading data of the first application from said storing section and controls to display the first screen corresponding to the first application on said display section when said first housing is rotated in relation to said second housing clockwise from the closed state, and starts a second application by reading data of the second application from said storing section and controls to display the second screen corresponding to the second application on said display section when said first housing is rotated in relation to said second housing counterclockwise from the closed state.

12. The portable terminal unit according to claim 11, wherein when said portable terminal unit is put in the opened state from the closed state that has a standby mode screen displayed on said display section, one of said first screen and said second screen becomes an address book screen and another of said first screen and said second screen becomes a menu selecting screen.

13. The portable terminal unit according to claim 11, wherein when said portable terminal unit is put in the opened state from the closed state that has an address book screen displayed on said display section, one of said first screen and said second screen becomes a screen during call-making and another of said first screen and said second screen becomes a mail creating screen.

14. The portable terminal unit according to claim 11, wherein when said portable terminal unit is put in the opened state from the closed state that has an address book screen displayed on said display section, one of said first screen and said second screen becomes a screen during call-making and another of said first screen and said second screen becomes a received mail box screen.

15. The portable terminal unit according to claim 11, wherein when said portable terminal unit is put in the opened state from the closed state that has a received mail box screen displayed on said display section, one of said first screen and said second screen becomes a screen during call-making and another of said first screen and said second screen becomes a mail creating screen.

16. The portable terminal unit according to claim 11, wherein when said portable terminal unit is put in the opened state from the closed state that has an incoming-call history screen displayed on said display section, one of said first screen and said second screen becomes a screen during call-making and another of said first screen and said second screen becomes a mail creating screen.

17. The portable terminal unit according to claim 11, wherein when said portable terminal unit is put in the opened state from the closed state that has an image reproduction screen to reproduce an image on said display section, one of said first screen and said second screen becomes an image editing screen and another of said first screen and said second screen becomes a mail creating screen to create a mail to which an image is automatically attached.

18. The portable terminal unit according to claim 11, wherein said portable terminal is a mobile telephone.

19. The portable terminal unit according to claim 11, wherein said portable terminal is a personal digital assistant.

* * * * *